US012789559B2

(12) United States Patent
Nakajima

(10) Patent No.: US 12,789,559 B2
(45) Date of Patent: Nov. 10, 2026

(54) FUNCTIONAL PART ASSEMBLY AND TIRE COMPRISING SAME

(71) Applicant: The Yokohama Rubber Co., LTD., Kanagawa (JP)

(72) Inventor: Taichi Nakajima, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 18/849,326

(22) PCT Filed: Mar. 16, 2023

(86) PCT No.: PCT/JP2023/010247

§ 371 (c)(1),
(2) Date: Sep. 20, 2024

(87) PCT Pub. No.: WO2023/182125

PCT Pub. Date: Sep. 28, 2023

(65) Prior Publication Data

US 2025/0196547 A1 Jun. 19, 2025

(30) Foreign Application Priority Data

Mar. 25, 2022 (JP) ................................ 2022-050180

(51) Int. Cl.
*B60C 19/00* (2006.01)

(52) U.S. Cl.
CPC ........ *B60C 19/00* (2013.01); *B60C 2019/004* (2013.01)

(58) Field of Classification Search
CPC .................. B60C 19/00; B60C 19/001; B60C 2019/004; B60C 23/0493
See application file for complete search history.

(56) References Cited

U.S. PATENT DOCUMENTS 6,899,153 B1 5/2005 Letkomiller et al.
2013/0081457 A1* 4/2013 Wilson .................. G01M 17/02 73/146

(Continued)

FOREIGN PATENT DOCUMENTS

JP 2013226853 A * 11/2013 ......... B60C 23/0493
JP 2015-160512 A 9/2015

(Continued)

OTHER PUBLICATIONS

Machine translation: JP-2019098852-A, Haneda Tomoyuki, (Year: 2025).*

(Continued)

*Primary Examiner* — Kendra Ly
(74) *Attorney, Agent, or Firm* — Thorpe North & Western

(57) ABSTRACT

In a functional component assembly including a functional component for detecting a tire state, and a support body that accommodates the functional component and is attached to a tire inner surface, the functional component is fixed inside a housing portion of the support body via a locking portion including a protrusion portion and a receiving portion, one of the protrusion portion and the receiving portion is provided on a side wall of the housing portion and the other of the protrusion portion and the receiving portion is provided on a portion of the functional component in contact with the side wall, and in a state where the functional component is not accommodated in the support body, a ratio h/H of a height H of the locking portion on the support body side and a height h of the locking portion on the functional component side satisfies a relationship 1.00<h/H≤1.40.

12 Claims, 13 Drawing Sheets

(56) References Cited

U.S. PATENT DOCUMENTS

| | | | | |
|---|---|---|---|---|
| 2020/0031178 | A1* | 1/2020 | Ishii | B60C 19/00 |
| 2021/0370728 | A1* | 12/2021 | Naruse | B60C 19/00 |

FOREIGN PATENT DOCUMENTS

| | | | | | |
|---|---|---|---|---|---|
| JP | 2018-94968 | A | | 6/2018 | |
| JP | 2018-197047 | A | | 12/2018 | |
| JP | 2019064543 | A | * | 4/2019 | |
| JP | 2019093947 | A | * | 6/2019 | |
| JP | 2019098852 | A | * | 6/2019 | B60C 23/0493 |
| JP | 2020040463 | A | * | 3/2020 | |
| JP | 2020040466 | A | * | 3/2020 | |
| JP | 2020-164112 | A | | 10/2020 | |
| WO | WO-2020105511 | A1 | * | 5/2020 | B60C 5/14 |
| WO | 2021/186838 | A1 | | 9/2021 | |

OTHER PUBLICATIONS

Machine translation: JP-2013226853-A, Yamaguchi Shigeru, (Year: 2025).*

Machine translation: JP-2019093947-A, Ichimura Atsushi, (Year: 2025).*

Machine translation: JP-2020040463-A, Yamaguchi Shigeru, (Year: 2025).*

Machine translation: JP-2020040466-A, Yamaguchi Shigeru, (Year: 2025).*

Machine translation: JP-2019064543-A, Hayashi Kazuo, (Year: 2026).*

* cited by examiner

FUNCTIONAL PART ASSEMBLY AND TIRE COMPRISING SAME

TECHNICAL FIELD

The present technology relates to a functional component assembly including a functional component having a function of detecting a state of a tire, and a support body thereof, and a tire including the functional component assembly.

BACKGROUND ART

In recent years, a sensor unit (functional component) including a sensor for acquiring tire internal information, such as internal pressure or temperature, has been installed in a tire cavity. In order to attach such a functional component to a tire inner surface, a support body that functions as a pedestal of the functional component is bonded to the tire inner surface, and the functional component is stored inside the support body (for example, see Japan Unexamined Patent Publication No. 2015-160512 A). However, if the functional component is not sufficiently held by the support body, the functional component may fall off or be damaged by an impact or the like during travel.

SUMMARY

The present technology provides a functional component assembly that makes it possible to prevent a functional component from falling off and provide improved damage resistance, and a tire including the functional component assembly.

An embodiment of the present technology provides a functional component assembly including: a functional component having a function of detecting a state of a tire; and a support body configured to accommodate the functional component and attached to a tire inner surface, in which the support body includes a base portion having a sheet shape and a housing portion having a side wall protruding from one surface of the base portion and configured to accommodate at least a part of the functional component, an other surface of the base portion being an attachment surface to the tire inner surface, the functional component is fixed inside the housing portion via a locking portion, the locking portion is configured by a pair composed of a protrusion portion that is provided on one of the side wall of the housing portion or a portion of the functional component in contact with the side wall and that protrudes toward the other of the side wall of the housing portion or the portion of the functional component in contact with the side wall and a receiving portion that is provided on the other of the side wall of the housing portion or the portion of the functional component in contact with the side wall and that is configured to be in contact with the protrusion portion, and contact of the protrusion portion with the receiving portion fixes the functional component inside the housing portion, and in a state where the functional component is not accommodated in the support body, when a height of the locking portion on the support body side from a lower end of the side wall is H and a height of the locking portion on the functional component side from a bottom surface is h, the heights H and h satisfy a relationship $1.00<h/H\leq 1.40$.

In an embodiment of the present technology, since the locking portion configured by a pair composed of the protrusion portion and the receiving portion is provided on the side wall of the housing portion and the portion of the functional component in contact with the side wall, and the functional component is fixed inside the housing portion by contact of the protrusion portion with the receiving portion, it is possible to suppress movement of the functional component in a vertical direction with respect to the tire inner surface. In addition, since the height H of the locking portion on the support body side and the height h of the locking portion on the functional component side satisfy the above-described relationship, the functional component is pressed toward the tire inner surface side when the protrusion portion and the receiving portion come into contact with each other, making it possible to effectively prevent the functional component from falling off and to improve the damage resistance.

In an embodiment of the present technology, in a state where the functional component is accommodated in the support body, when a height of the locking portion on the support body side from the lower end of the side wall is H' and a maximum thickness of the functional component is T, H' and T preferably satisfy relationships 5.0 mm$\leq$T$\leq$30.0 mm and $0.30\leq H'/T\leq 1.00$. Such dimensions are advantageous for preventing the functional component from falling off and improving the damage resistance. In particular, when the maximum thickness T of the functional component is within the above-described range, it is possible to suppress a load applied to the side wall of the housing portion when the functional component is accommodated. In addition, when the ratio H'/T is within the above-described range, it is possible to effectively prevent the functional component from falling off.

In an embodiment of the present technology, when a maximum length of the functional component in a horizontal direction is L, a protruding amount of the protrusion portion is LH, and a thickness of the protrusion portion is LV, L, LH, and LV preferably satisfy relationships 5.0 mm$\leq$L$\leq$35.0 mm, $0.04\leq LH/L\leq 0.40$, and $0.10\leq LH/LV\leq 3.00$. With such dimensions, the fitting protrusion portion has an appropriate size, which is advantageous for preventing the functional component from falling off and improving the damage resistance.

In an embodiment of the present technology, preferably, an outer shape of the functional component is a columnar shape, the housing portion has a cylindrical shape corresponding to the functional component, and a sum of projection lengths of the locking portion on a circumference of the side wall is ¾ times to 1 time a circumferential length of the side wall. In an aspect in which the outer shape of the functional component is a columnar shape and the housing portion has a cylindrical shape corresponding to the functional component, securing the length of the locking portion on the circumference of the side wall as described above is advantageous for preventing the functional component from falling off and improving the damage resistance.

In an embodiment of the present technology, a plurality of locking portions may be provided along a height direction of the side wall of the housing portion and a height direction of the functional component. According to this configuration, since the functional component is fixed to the housing portion by each of the plurality of locking portions, it is possible to more firmly fix the functional component, which is advantageous for preventing the functional component from falling off and improving the damage resistance.

In an embodiment of the present technology, an outer shape of the functional component may be a columnar shape, the housing portion may have a cylindrical shape corresponding to the functional component, and the locking portion may be provided in a spiral shape. According to this configuration, since the spiral locking portion substantially functions as a screw, the functional component can be fixed to the housing portion by being rotated, and thus the functional component can be fixed more firmly and stably.

In an embodiment of the present technology, the functional component may include a sensor configured to acquire tire information, and the sensor may include a piezoelectric element. According to this configuration, when the functional component is pressed toward the tire inner surface side as described above, vibration or the like can be more accurately detected.

In an embodiment of the present technology, an elongation at break EB of rubber constituting the support body preferably ranges from 50% to 900%, and a modulus at 300% elongation of the rubber constituting the support body preferably ranges from 2 MPa to 16 MPa. As a result, it is possible to improve the workability when inserting the functional component into the support body (housing portion), the holding property of the support body, and the breaking resistance of the support body in a well-balanced manner. Note that the elongation at break and the modulus at 300% elongation of the rubber constituting the support body are measured in conformity to JIS (Japanese Industrial Standard)-K6251.

The functional component assembly of an embodiment of the present technology is used attached to a tire inner surface. A tire including the functional component assembly of an embodiment of the present technology attached to the tire inner surface (hereinafter, referred to as "tire of an embodiment of the present technology") can effectively prevent the functional component from falling off and provide improved damage resistance by the above-described characteristics of the functional component assembly of an embodiment of the present technology. Note that the tire according to an embodiment of the present technology is preferably a pneumatic tire, but may be a non-pneumatic tire. In the case of a pneumatic tire, the inside thereof may be filled with air, an inert gas such as nitrogen, or other gases.

In the tire of an embodiment of the present technology, preferably, the functional component includes a sensor configured to acquire tire information, and a shortest distance between the sensor and the tire inner surface is equal to or less than 5 mm. By bringing the sensor close to the tire inner surface in this way, the tire information can be easily acquired. However, by using the functional component assembly of an embodiment of the present technology described above, the sensor can be more firmly and stably fixed at a suitable position close to the tire inner surface.

In the tire of an embodiment of the present technology, the support body may be fixed to the tire inner surface, while the functional component may be detachable from the support body. With this configuration, it is possible to replace only the functional component accommodated in the support body while leaving the support body on the tire inner surface, which is advantageous for reducing costs.

In the tire of an embodiment of the present technology, the support body may be fixed to the tire inner surface via an adhesive layer. In addition, in the tire of an embodiment of the present technology, the tire information about the tire to which the functional component assembly is attached may be periodically and automatically transmitted.

DETAILED DESCRIPTION

Configurations of embodiments of the present technology will be described in detail below with reference to the accompanying drawings.

Figure 1:
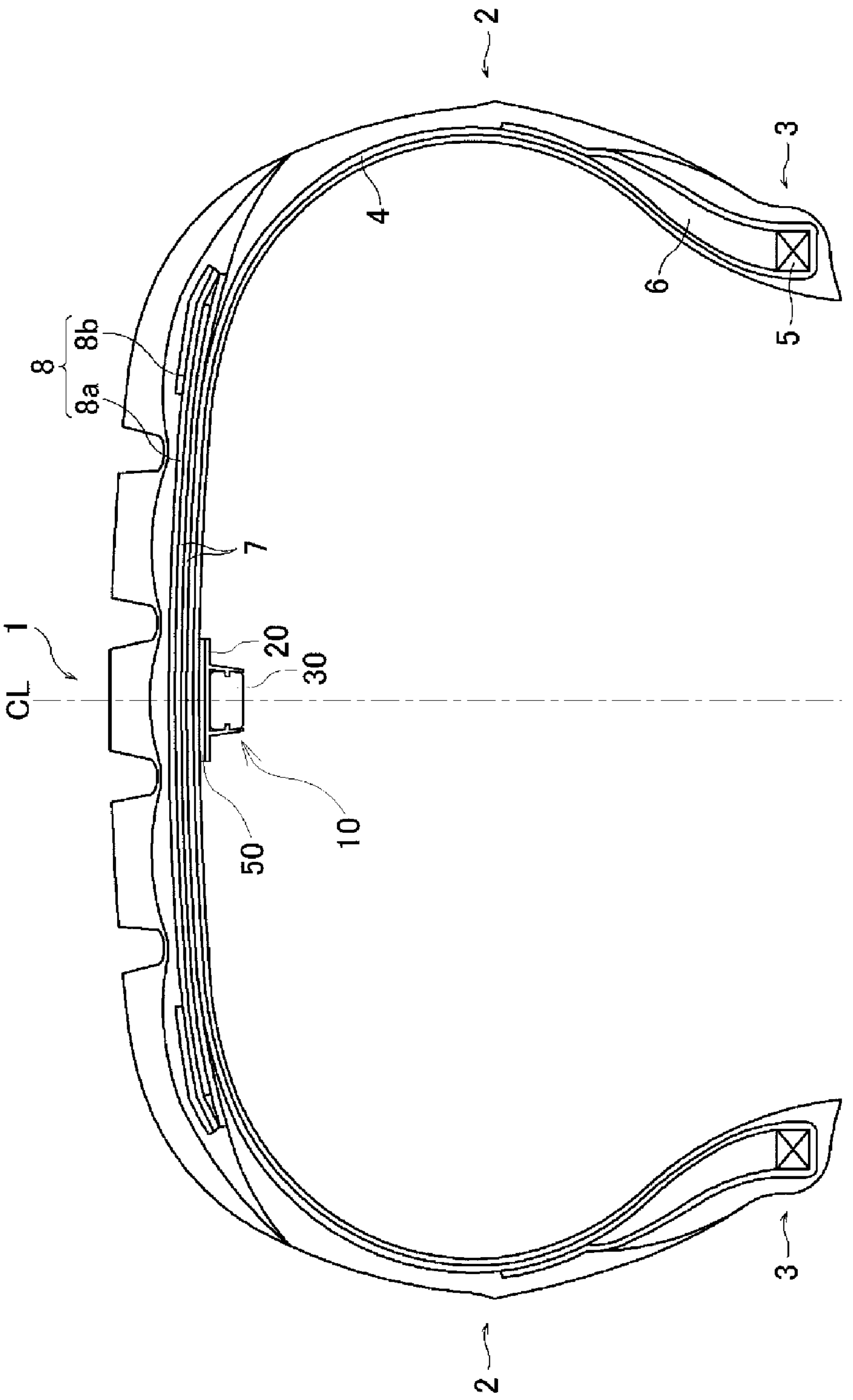
FIG. 1 is a meridian cross-sectional view illustrating an example of a pneumatic tire according to an embodiment of the present technology.

For example, as illustrated in FIG. 1, a tire (pneumatic tire) to which a functional component assembly according to an embodiment of the present technology is attached includes a tread portion 1, a pair of sidewall portions 2 disposed on both sides of the tread portion 1, and a pair of bead portions 3 disposed on an inner side of the sidewall portions 2 in a tire radial direction. "CL" in FIG. 1 denotes a tire equator. Although not illustrated in FIG. 1, which is a meridian cross-sectional view, the tread portion 1, the sidewall portions 2, and the bead portions 3 each extend in a tire circumferential direction and form an annular shape. This forms a toroidal basic structure of the pneumatic tire. Although the description using FIG. 1 is basically based on the illustrated meridian cross-sectional shape, all of the tire components extend in the tire circumferential direction and form the annular shape.

A carcass layer 4 including a plurality of reinforcing cords (hereinafter, referred to as carcass cords) extending in the tire radial direction is mounted between the pair of bead portions 3 on the right and left. A bead core 5 is embedded in each of the bead portions, and a bead filler 6 having an approximately triangular cross-sectional shape is disposed on an outer circumference of the bead core 5. The carcass layer 4 is folded back around the bead core 5 from an inner side to an outer side in a tire width direction. Accordingly, the bead core 5 and the bead filler 6 are wrapped by a body portion (a portion extending from the tread portion 1 through each of the sidewall portions 2 to each of the bead portions 3) and a folded back portion (a portion folded back around the bead core 5 of each bead portion 3 and extending toward each sidewall portion 2 side) of the carcass layer 4.

A plurality of belt layers 7 (in the illustrated example, two layers) are embedded on an outer circumferential side of the carcass layer 4 in the tread portion 1. Each of the belt layers 7 includes a plurality of reinforcing cords (hereinafter, referred to as belt cords) inclined with respect to the tire circumferential direction, and the belt cords are disposed so as to intersect with one another between the layers. In the belt layers 7, an inclination angle of the belt cord with respect to the tire circumferential direction may be set within a range, for example, from 10° to 40°. For example, steel cords are preferably used as the belt cords constituting the belt layers 7.

In addition, a belt cover layer 8 is provided on the outer circumferential side of the belt layers 7. The belt cover layer 8 includes a reinforcing cord (hereinafter, referred to as a cover cord) oriented in the tire circumferential direction. In the belt cover layer 8, an angle of the cover cord with respect to the tire circumferential direction may be set to, for example, 0° to 5°. As the belt cover layer 8, a full cover layer 8*a* that covers an entire region of the belt layers 7 in the width direction, and a pair of edge cover layers 8*b* that locally cover both end portions of the belt layers 7 in the tire width direction can be provided individually or in combination (in the illustrated example, both of the full cover layer 8*a* and the edge cover layers 8*b* are provided). An organic fiber cord such as nylon or aramid is preferably used as the cover cord of the belt cover layer 8.

Since an embodiment of the present technology mainly relates to a functional component assembly 10, which will be described below, the basic structure of the tire on which the functional component assembly 10 is mounted is not limited to that described above.

In the example of FIG. 1, the functional component assembly 10 is attached to a tire inner surface (a center of the tread portion 1 in the tire width direction). The attaching position of the functional component assembly 10 is not particularly limited. However, when a sensor included in the functional component assembly 10 acquires tire tread information, the functional component assembly 10 may be provided at the center of the tread portion 1 in the tire width direction as illustrated in the drawing.

Figure 2:
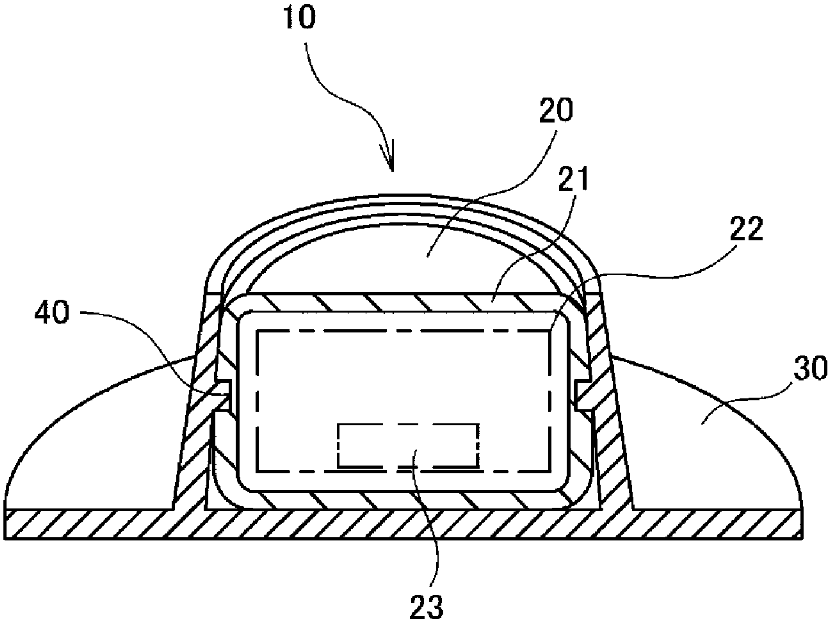
FIG. 2 is a perspective cross-sectional view illustrating a functional component assembly attached to the tire of FIG. 1.

As illustrated in an enlarged view of FIG. 2, the functional component assembly 10 includes a functional component 20 having a function of detecting a state of a tire, and a support body 30 that accommodates the functional component 20 and is attached to the tire inner surface.

For example, as illustrated in FIG. 2, the functional component 20 includes a housing 21 and an electronic component 22. The housing 21 has a hollow structure and accommodates the electronic component 22 inside. The electronic component 22 includes a sensor 23 for acquiring tire information, a transmitter, a receiver, a control circuit, a battery, or the like as appropriate. Examples of the tire information acquired by the sensor 23 include an internal temperature and internal pressure of the pneumatic tire, a wear amount of the tread portion 1, tire deformation, a road surface state, a ground contact length, a ground contact width, a load, vibrations, a wheel rotation speed, an acceleration, and the like. For example, a temperature sensor or a pressure sensor is used to measure an internal temperature or internal pressure. When detecting a wear amount of the tread portion 1, a piezoelectric sensor (piezoelectric element) that comes into direct or indirect contact with the tire inner surface can be used as the sensor 23, and the piezoelectric sensor (piezoelectric element) detects an output voltage corresponding to tire deformation, vibration, and impact during travel, and detects a wear amount of the tread portion 1 based on the output voltage. Note that the piezoelectric sensor (piezoelectric element) can detect an output voltage corresponding to tire deformation, vibration, and impact during travel even when the piezoelectric sensor is in indirect contact with the tire inner surface via the housing 21 or a support body, which will be described below. Moreover, an acceleration sensor or a magnetic sensor can also be used. In addition, the functional component 20 is configured to transmit the tire information acquired by the sensor 23 to the outside of the tire. The transmission of the tire information may be performed periodically and automatically. Note that the internal structure of the functional component 20 illustrated in FIG. 2 illustrates an example of the functional component and is not limited thereto.

An outer shape of the functional component 20 (housing 21) is not particularly limited, but as illustrated in FIGS. 2 and 3, preferably has a bottom surface 20A in direct or indirect contact with the tire inner surface, an upper surface 20B facing a tire cavity side, and a side surface 20C interposed between the bottom surface 20A and the upper surface 20B and being in contact with a side wall of a support body, which will be described below. Examples of such a shape include a columnar shape (FIG. 2) and a rectangular parallelepiped shape (not illustrated). Note that, in any case, it is not necessary to be a strict column or rectangular parallelepiped, and for example, corner portions may be chamfered. In addition, the side surface 20C does not need to have a linear shape in a cross section as illustrated in the drawing, and the side surface 20C may have an arc shape (for example, a curved shape that is convex toward a side wall 30A of the support body 30). In such a shape, a locking portion 40, which will be described below, is provided at a portion (side surface 20C) in contact with the side wall of the support body 30.

Figure 4:
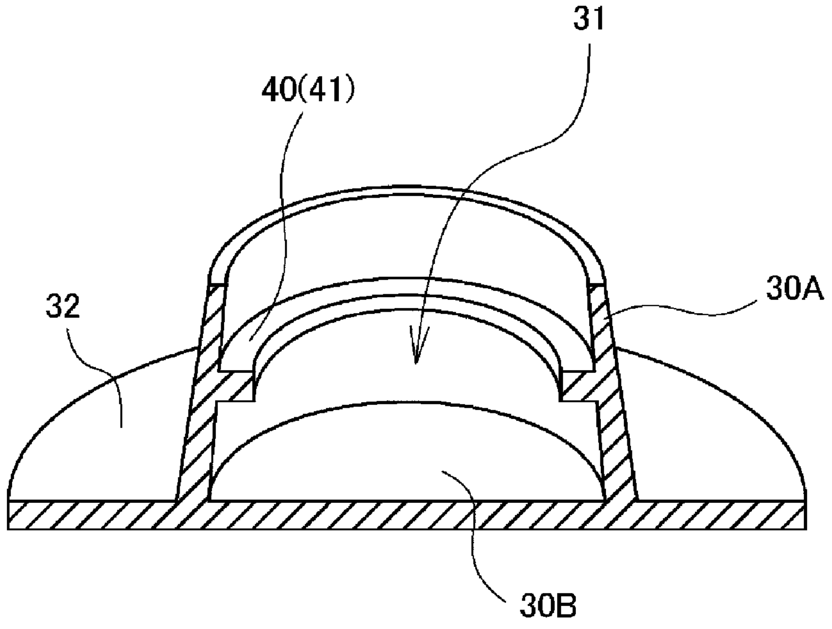
FIG. 4 is a perspective cross-sectional view illustrating a support body in the functional component assembly of FIG. 2.

The support body 30 accommodates the functional component 20. As illustrated in FIG. 4, the support body 30 has a housing portion 31 into which the functional component 20 is inserted. In the illustrated example, the housing portion 31 is provided on a surface on one side of a base portion 32 having a sheet shape, and a surface on the other side is an attachment surface attached to the tire inner surface. The support body 30 may be vulcanization-bonded to the tire inner surface or may be bonded to the vulcanized tire via an adhesive layer 50. The support body 30 may be made of rubber, for example. That is, when the support body 30 is made of rubber, it is favorable because the support body expands and contracts while the functional component 20 is inserted into and taken out of the housing portion 31.

Examples of the material of the support body 30 include chloroprene rubber (CR), butyl rubber (IIR), natural rubber (NR), acrylonitrile-butadiene copolymer rubber (NBR), butadiene rubber (BR), and styrene-butadiene rubber (SBR), and a single material or a blend of two or more materials can be used. Since these materials are excellent in adhesiveness to butyl rubber constituting the tire inner surface, when the support body 30 is formed of the above materials, sufficient adhesiveness between the support body 30 and the tire inner surface can be secured.

The physical properties of the rubber constituting the support body 30 are not particularly limited. However, from the perspective of the workability when inserting the functional component 20 into the support body 30 (housing portion 31), the holding property of the support body 30 for the functional component 20, the breaking resistance of the support body 30, and the like, an elongation at break EB is preferably 50% to 900%, and a modulus at 300% elongation is preferably 2 MPa to 16 MPa. With such physical properties, it is possible to improve the above-described characteristics (the workability when inserting the functional component 20 into the support body 30, the holding property of the support body for the functional component 20, and the breaking resistance of the support body 30) in a well-balanced manner.

In the example of FIG. 4, the housing portion 31 of the support body 30 includes a side wall 30A surrounding a periphery of the functional component 20 and a contact surface 30B with which the bottom surface 20A of the functional component 20 comes into contact when the functional component is accommodated. The housing portion 31 preferably has a shape corresponding to the outer shape of the functional component 20 (housing 21). For example, when the outer shape of the functional component 20 (housing 21) is a columnar shape, the housing portion 31 may have a cylindrical shape corresponding to the columnar shape of the functional component 20 (housing 21). When the outer shape of the functional component 20 (housing 21) is a rectangular parallelepiped shape, the housing portion 31 may be a rectangular parallelepiped recess in which the functional component 20 (housing 21) is accommodated. In such a shape, a locking portion 40, which will be described below, is provided on the side wall 30A of the support body 30.

Figure 5:
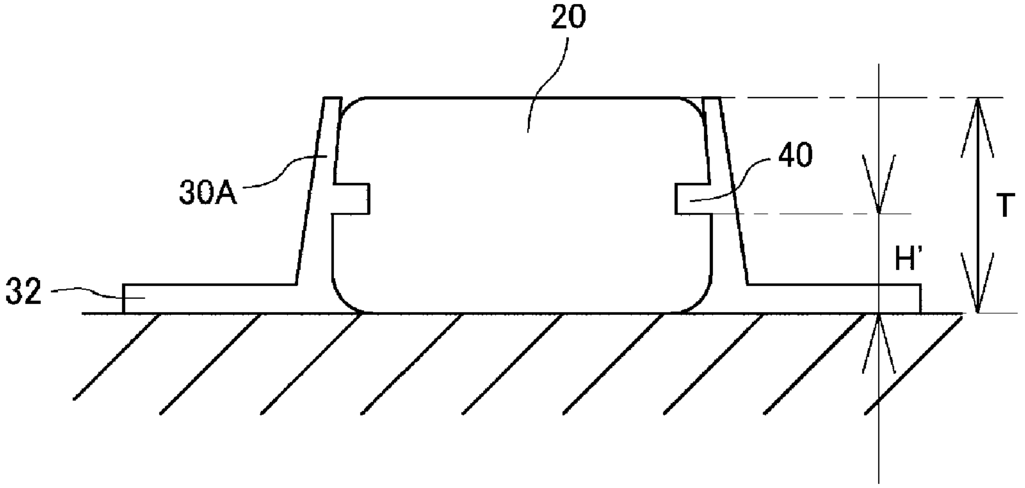
FIG. 5 is a cross-sectional view schematically illustrating another embodiment of the functional component assembly.

Since the support body 30 is attached to the tire inner surface, the support body is not necessarily required to have the contact surface 30B described above. That is, as illustrated in FIG. 5, the housing portion 31 may be configured only by the side wall 30A surrounding the periphery of the functional component 20. In this case, a space surrounded by the side wall 30A and the tire inner surface serves as the housing portion 31, and can accommodate the functional component 20. In this case, the functional component 20 accommodated in the housing portion 31 comes into direct contact with the tire inner surface (hatched portion in the drawing), which is advantageous for acquiring tire information. Also in this case, a locking portion 40, which will be described below, is provided on the side wall 30A of the support body 30.

Figure 6:
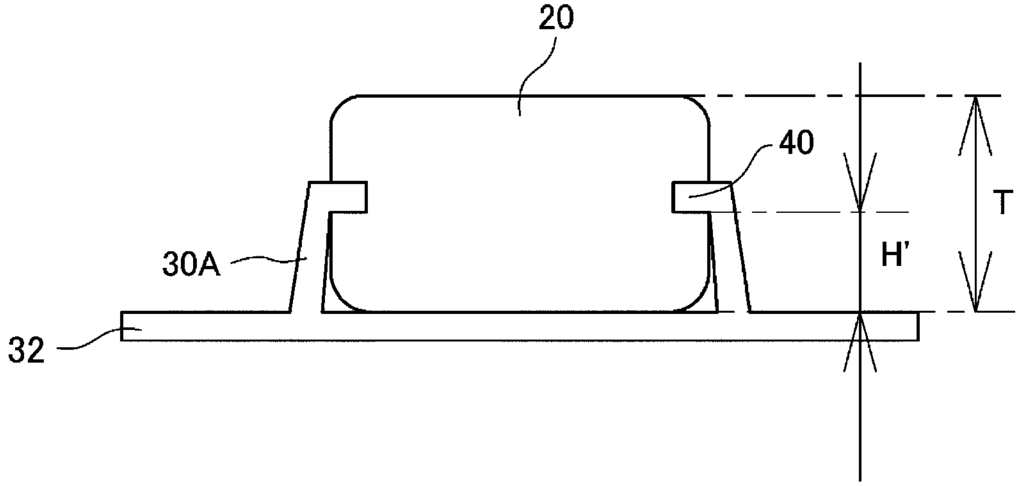
FIG. 6 is a cross-sectional view schematically illustrating another embodiment of the functional component assembly.

The housing portion 31 of the support body 30 does not need to accommodate the entire functional component 20, and may accommodate at least a part of the functional component. For example, in the example of FIG. 6, a height of the side wall 30A is lower than that of the functional component 20, and a locking portion 40, which will be described below, is provided at an upper end of the side wall 30A. Even if the entire functional component 20 is not accommodated in the housing portion 31 in this way, the functional component 20 is fixed inside the housing portion 31 by the locking portion 40, which will be described below, and thus the functional component 20 is prevented from falling off.

Figure 3A:
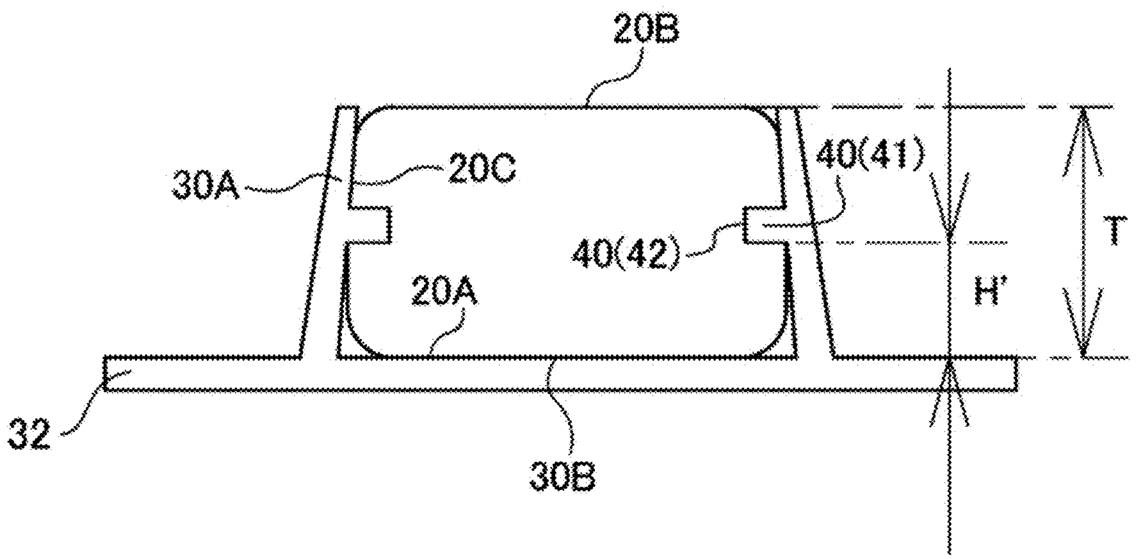
FIGS. 3A and 3B are cross-sectional views schematically illustrating the functional component assembly.
Figure 3B:
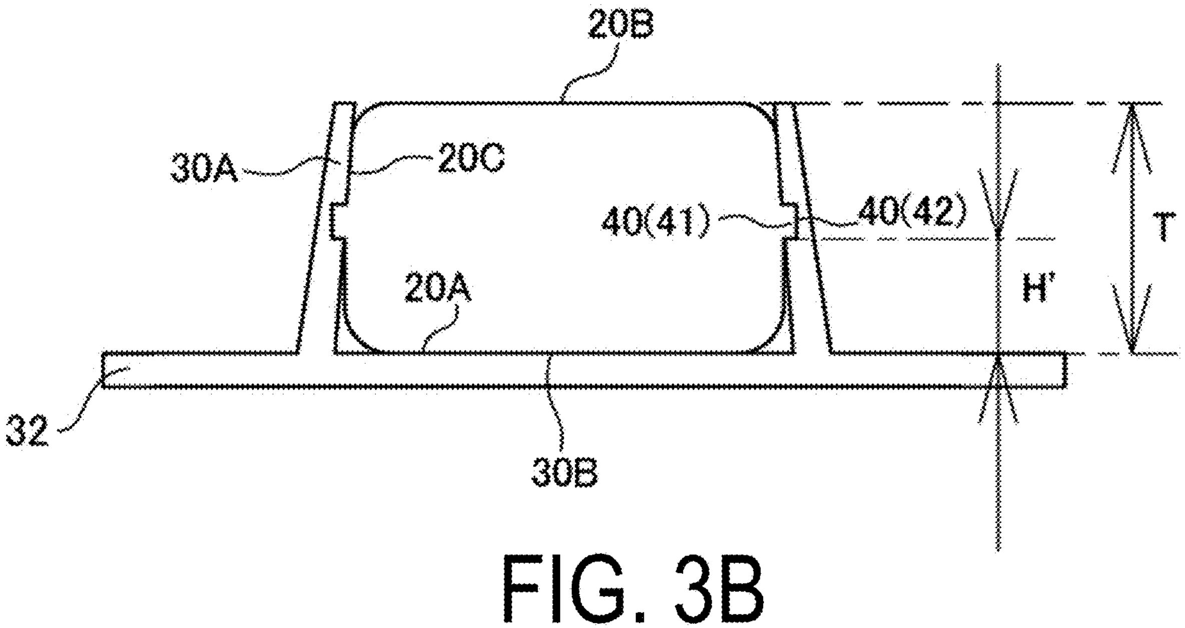

The locking portion 40 provided on the functional component 20 and the support body 30 is configured by a pair composed of a protrusion portion 41 and a receiving portion 42, and the protrusion portion 41 is received by the receiving portion 42, thereby fixing the functional component 20 inside the housing portion 31. For example, in an aspect of FIG. 3, the locking portion 40 is configured by a pair composed of the protrusion portion 41 (fitting protrusion portion) and the receiving portion 42 (fitting recess portion), and as illustrated in FIG. 3, the fitting protrusion portion 41 is fitted into the fitting recess portion 42, thereby fixing the functional component 20 inside the housing portion 31. One of the fitting protrusion portion 41 and the fitting recess portion 42 is provided on the housing portion 31 side (side wall 30A), and the other of the fitting protrusion portion 41 and the fitting recess portion 42 is provided on the functional component 20 side (side surface 20C). That is, when the fitting protrusion portion 41 is provided on the support body 30 side (the case of FIG. 3A), the fitting recess portion 42 is provided on the functional component 20 side. Conversely, when the fitting protrusion portion 41 is provided on the functional component 20 side (the case of FIG. 3B), the fitting recess portion 42 is provided on the support body 30 side. In this way, the locking portion 40 is provided on the side wall 30A of the housing portion 31 and the side surface 20C of the functional component 20, and the fitting protrusion portion 41 is fitted into the fitting recess portion 42, thereby fixing the functional component 20 inside the housing portion 31. As a result, it is possible to suppress movement of the functional component 20 in the vertical direction with respect to the tire inner surface, making it possible to effectively prevent the functional component 20 from falling off.

Figure 7:
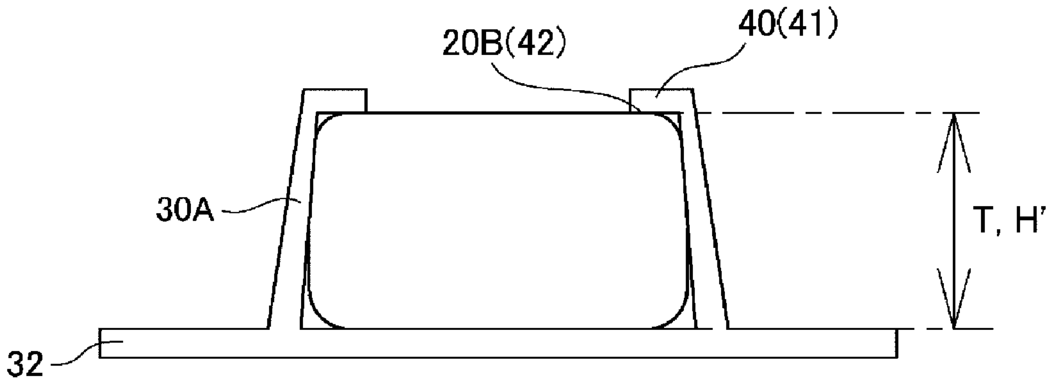
FIG. 7 is a cross-sectional view schematically illustrating another embodiment of the functional component assembly.

In addition to the locking portion 40 (combination of the fitting protrusion portion 41 and the fitting recess portion 42) as illustrated in FIG. 3, for example, as illustrated in an aspect of FIG. 7, a protrusion portion 41 protruding toward the functional component side may be provided at an upper end of the side wall 30A, as the protrusion portion 41 on the housing portion 31 side. In this aspect, the upper surface 20B of the functional component 20 in contact with the protrusion portion 41 functions as the receiving portion 42, and movement of the functional component 20 in the vertical direction with respect to the tire inner surface is suppressed.

Figure 8A:
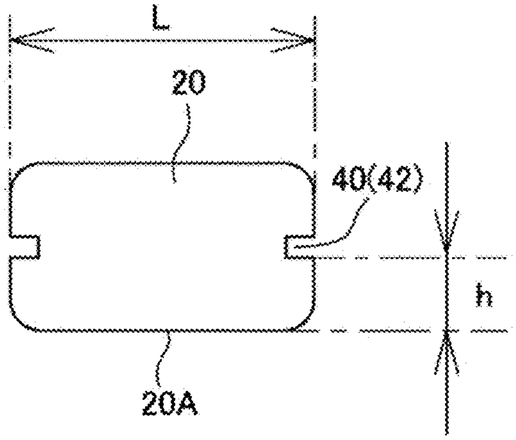
FIGS. 8A to 8C are cross-sectional views schematically illustrating a functional component assembly in a state where a functional component is not accommodated in a support body.
Figure 8B:
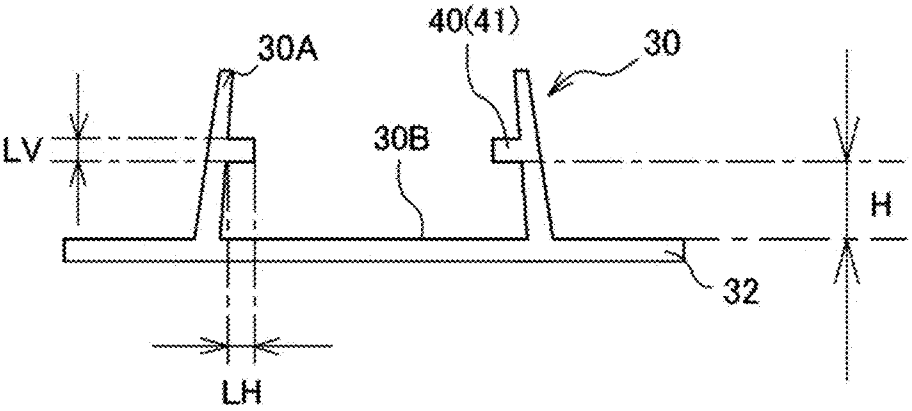
Figure 8C:
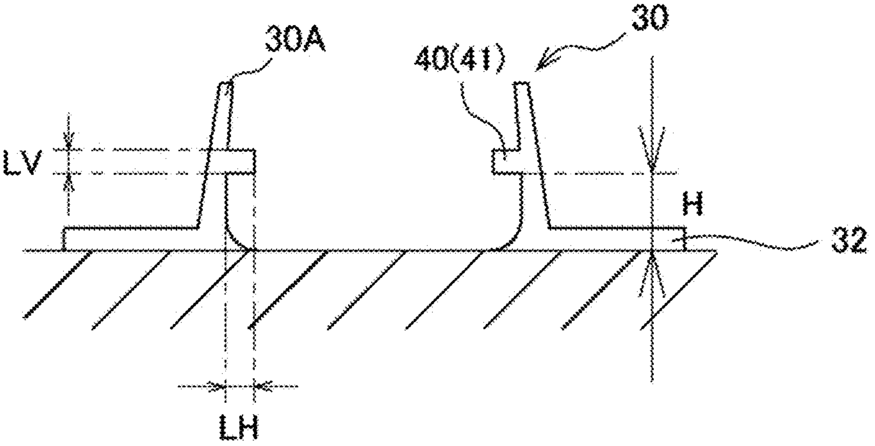

In a state where the functional component 20 is not accommodated in the support body 30 as illustrated in FIGS. 8A to 8C, when a height of the locking portion 40 (the fitting protrusion portion 41 in the illustrated example) on the support body 30 side from a lower end of the side wall 30A is H and a height of the locking portion 40 (the fitting recess portion 42 in the illustrated example) on the functional component 20 side from the bottom surface 20A is h, a ratio h/H of the heights H and h satisfies a relationship $1.00<h/H\leq1.40$, and preferably $1.01\leq h/H\leq1.20$. By satisfying such a relationship of the ratio h/H, when the fitting protrusion portion 41 is fitted into the fitting recess portion 42, the functional component 20 is pressed toward the tire inner surface side, so that it is possible to effectively prevent the functional component 20 from falling off and to provide improved damage resistance. If the ratio h/H is 1.00 or less, the functional component 20 cannot be pressed toward the tire inner surface side, and the effect of preventing the functional component 20 from falling off cannot be sufficiently obtained. If the ratio h/H exceeds 1.40, a load is applied to a root of the side wall 30A of the support body 30 (the vicinity of a boundary between the side wall 30A and the contact surface 30B) when the functional component 20 is accommodated, and the functional component assembly is likely to be damaged.

Note that, as illustrated in the drawing, the height H is measured on the basis of a point, which is closest to the lower end of the side wall 30A, in the locking portion 40 on the support body 30 side. That is, when the support body 30 has the contact surface 30B (the case of FIG. 8B), the lower end of the side wall 30A coincides with the contact surface 30B, and thus the height His a height from the contact surface 30B to the locking portion 40 (a point closest to the contact surface 30B). In addition, when the support body 30 does not have the contact surface 30B (the case of FIG. 8C), the lower end of the side wall 30A coincides with the tire inner surface, and thus the height H is a height from the tire inner surface to the locking portion 40 (a point closest to the tire inner surface). Similarly, as illustrated in the drawing, the height h is measured on the basis of a point, which is closest to the bottom surface 20A, in the locking portion 40 on the functional component 20 side. That is, in any case, the height h is a height from the bottom surface 20A to the locking portion 40 (a point closest to the bottom surface 20A).

In a state where the functional component 20 is accommodated in the support body 30 as illustrated in FIGS. 3A and 3B and FIGS. 5 to 7, when a height of the locking portion 40 on the support body 30 side from the lower end (the contact surface 30B or the tire inner surface) of the side wall 30A is H' and a maximum thickness of the functional component 20 is T, a ratio H'/T preferably satisfies a relationship 0.30≤H'/T≤1.00, and more preferably 0.60≤H'/T≤1.00. In this case, the maximum thickness Tis preferably set to 5.0 mm≤T≤30.0 mm, and more preferably 5.0 mm≤T≤20.0 mm. Such dimensions are advantageous for preventing the functional component 20 from falling off and improving the damage resistance. In particular, when the maximum thickness T of the functional component 20 is within the above-described range, it is possible to suppress a load applied to the side wall 30A of the housing portion 31 when the functional component 20 is accommodated. In addition, when the ratio H'/T is within the above-described range, it is possible to effectively prevent the functional component 20 from falling off. If the ratio H'/T is less than 0.30, a portion sandwiched between the locking portion 40 and the contact surface 30B (a portion contributing to stable fixing) is reduced, and thus there is a concern that the effect of preventing the functional component 20 from falling off may decrease. If the ratio H'/T exceeds 1.00, the functional component 20 cannot be pressed toward the tire inner surface side, and thus the effect of preventing the functional component 20 from falling off cannot be sufficiently obtained. In addition, if the maximum thickness T is less than 5.0 mm, the damage resistance of the functional component itself is reduced due to the thin thickness. On the other hand, if the maximum thickness T exceeds 30.0 mm, the weight of the functional component increases, the impact on the functional component increases, and the damage resistance of the functional component itself decreases.

The dimensions of the locking portion 40 are not particularly limited, but as illustrated in FIGS. 8A to 8C, when a maximum length of the functional component 20 in a horizontal direction is L, a protruding amount of the fitting protrusion portion 41 is LH, and a thickness of the fitting protrusion portion 41 is LV, a ratio LH/L preferably satisfies a relationship 0.04≤LH/L≤0.40, and more preferably 0.06≤LH/L≤0.20. In addition, a ratio LH/LV preferably satisfies a relationship 0.10≤LH/LV≤3.00, and more preferably 1.00≤LH/LV≤2.00. In this case, the maximum length L is preferably set to 5.0 mm≤L≤35.0 mm, and more preferably 10.0 mm≤L≤30.0 mm. With such dimensions, the fitting protrusion portion 41 has an appropriate size, which is advantageous for preventing the functional component 20 from falling off and improving the damage resistance. If the ratio LH/L is less than 0.04, the fitting protrusion portion 41 is too small, and thus the effect of preventing the functional component 20 from falling off is reduced. If the ratio LH/L exceeds 0.40, the fitting protrusion portion 41 is too large, and thus there is a concern that it may be difficult to attach and detach the functional component 20. If the ratio LH/LV is less than 0.10, the protruding amount LH is excessively small with respect to the thickness LV of the fitting protrusion portion 41, and thus the functional component 20 is likely to fall off due to an impact on the tire. If the ratio LH/LV exceeds 3.00, the protruding amount LH is excessively large with respect to the thickness LV of the fitting protrusion portion 41, and thus a load is likely to be applied to a root of the fitting protrusion portion 41 (a boundary between the fitting protrusion portion 41 and the side wall 30A or the side surface 20C on which the fitting protrusion portion 41 is provided), and the durability is reduced. Note that, in the illustrated cross-sectional shape, when the fitting protrusion portions 41 are provided on both the left and right side walls 30A (or side surfaces 20C), it is preferable that the protruding amounts LH and the thicknesses LV of the fitting protrusion portions 41 have common dimensions.

Figure 9:
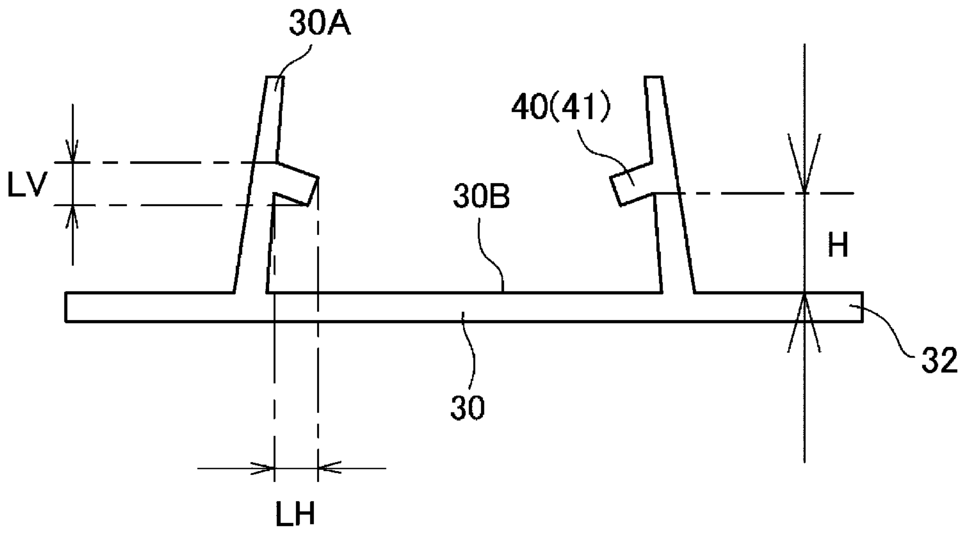
FIG. 9 is a cross-sectional view schematically illustrating another embodiment of the functional component assembly (support body).

Note that the locking portion 40 (protrusion portion 41) does not need to protrude along the horizontal direction of the functional component 20, and as illustrated in FIG. 9, a tip of the protrusion portion 41 may be inclined so as to face the tire inner surface side. In the case of this aspect, the inclination of the protrusion portion 41 is advantageous for suppressing movement of the functional component 20 in a direction in which the functional component falls off. Note that although the protrusion portion 41 itself is inclined in this aspect, the protruding amount LH and the thickness LV are measured along the horizontal direction or vertical direction as illustrated in FIG. 9.

Figure 10:
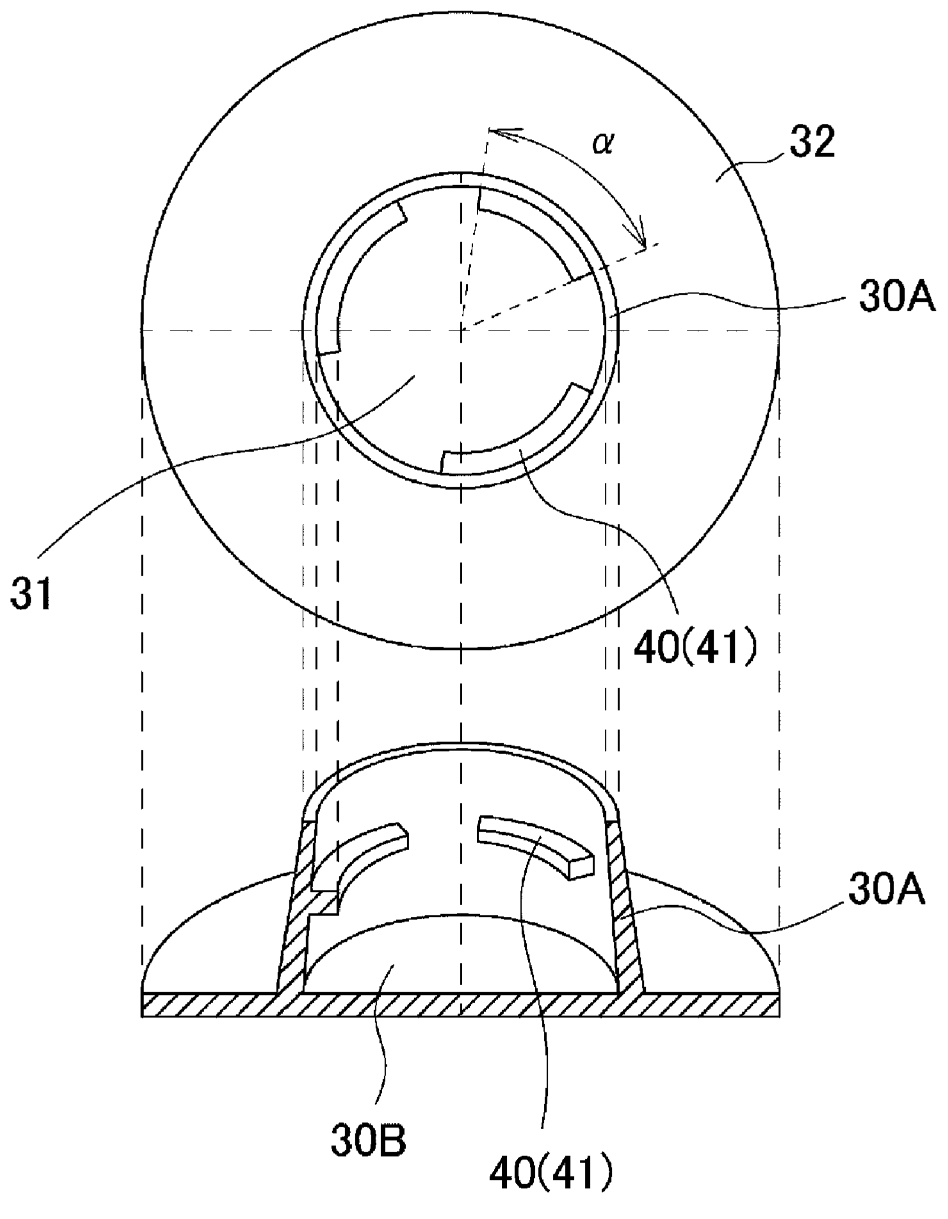
FIG. 10 is an explanatory diagram illustrating a combination of a top view and a perspective cross-sectional view of another embodiment of the functional component assembly (support body).

When the outer shape of the functional component 20 is a columnar shape and the housing portion 31 has a cylindrical shape corresponding to the functional component 20, as illustrated in FIG. 10, the locking portion 40 (the protrusion portion 41 and the receiving portion 42) does not need to be formed over the entire circumference of the side wall 30A and the side surface 20C. In the illustrated example, a plurality of arc-shaped locking portions 40 (protrusion portions 41 provided on the support body 30 side) are intermittently provided on the side wall 30A (although not illustrated, receiving portions 42 corresponding to the protrusion portions 41 are provided on the functional component 20 side). In such an aspect, a sum of projection lengths a of the locking portions 40 on a circumference of the side wall 30A is preferably 75% to 100%, and more preferably 90% to 100% of a circumferential length (entire circumference) of the side wall 30A. Providing a sufficient amount of the locking portion 40 on the circumference of the side wall 30A (and the side surface 30C) as described above is advantageous for preventing the functional component 20 from falling off and improving the damage resistance. Note that, from the perspective of firmly fixing the functional component 20, it is preferable that the locking portion 40 be formed over the entire circumference of the side wall 30A and the side surface 20C, but from the perspective of the shape of the functional component 20 and the operability when attaching and detaching the functional component 20, it is also preferable that the locking portion 40 be intermittently provided within the above-described length range. Note that, "the sum of the projection lengths a of the locking portions on the circumference of the side wall" is a sum of lengths of the locking portions 40 when the housing portion 31 is viewed from an upper side (an opening side into which the functional component 20 is inserted) as illustrated in FIG. 10. In addition, when the locking portions 40 overlap each other when the housing portion 31 is viewed from the upper side, the sum means a sum of only lengths of portions viewed from the upper side of the housing portion 31.

Figure 11A:
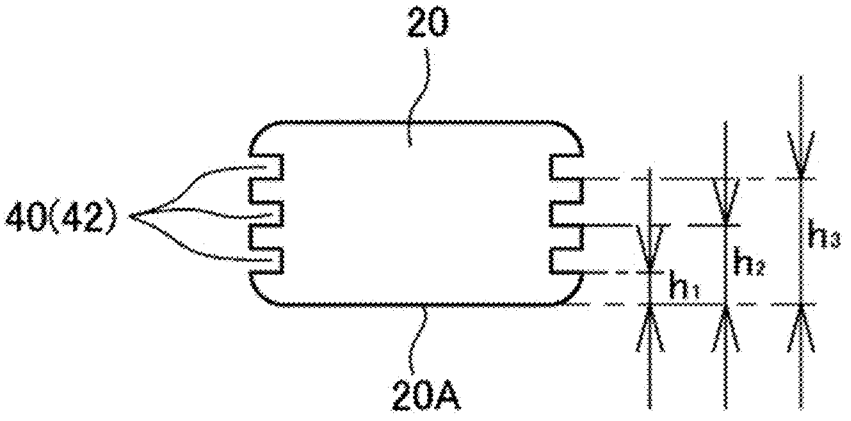
FIGS. 11A and 11B are cross-sectional views schematically illustrating still another embodiment of the functional component assembly.
Figure 11B:
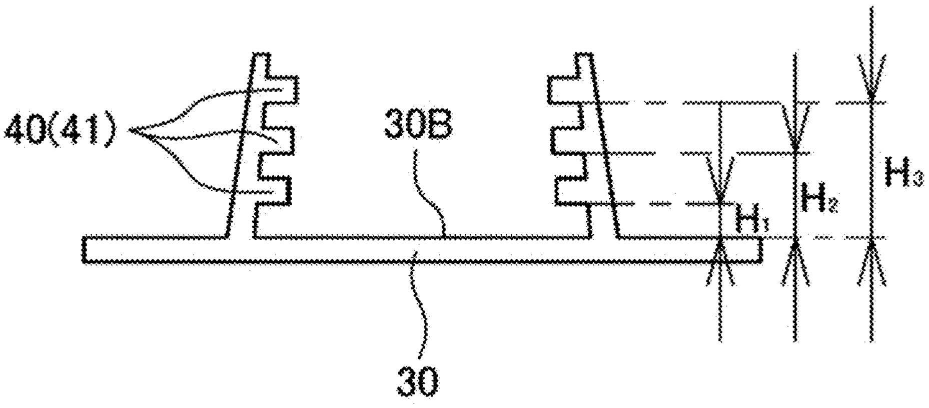

As illustrated in FIGS. 11A and 11B, a plurality of locking portions 40 may be provided along a height direction of the side wall 30A of the housing portion 31 and a height direction of the side surface 20C of the functional component 20. According to this configuration, since the functional component 20 is fixed to the housing portion 31 by each of the plurality of locking portions 40, it is possible to more firmly fix the functional component 20, which is advantageous for preventing the functional component from falling off and improving the damage resistance. Also in this case, it is preferable that the height H of the locking portion 40 on the support body side 30 and the height h of the locking portion 40 on the functional component 20 side in a state where the functional component 20 is not accommodated in the support body 30 satisfy the above-described relationship. Specifically, in a state where the functional component 20 is not accommodated in the support body 30, when heights of the plurality of locking portions 40 on the support body 30 side (heights from the lower end of the side wall 30A) are defined as $H_1$, $H_2$, $H_3$ . . . in ascending order and heights of the plurality of locking portions 40 on the functional component 20 side (heights from the bottom surface 20A) are defined as $h_1$, $h_2$, $h_3$ . . . in ascending order, height ratios $h_1/H_1$, $h_2/H_2$, $h_3/H_3$ . . . of the locking portions 40 to fit to each other satisfy a relationship of greater than 1.00 and 1.40 or less, and preferably 1.01 or greater and 1.20 or less. In addition, it is preferable that the height ratios $h_1/H_1$, $h_2/H_2$, $h_3/H_3$ . . . be substantially equal to each other, and when each n-th height from the contact surface 30B or surface 20A side is indicated by $H_n$, $h_n$ (n is a natural number of 1 or greater), the heights preferably satisfy a relationship $(h_n/H_n)\times 0.9<h_{n+1}/H_{n+1}<(h_n/H_n)\times 1.1$. Accordingly, the deviation of the locking force between the plurality of locking portions 40 is suppressed, and thus it is possible to suppress the damage of the locking portions 40.

Figure 12:
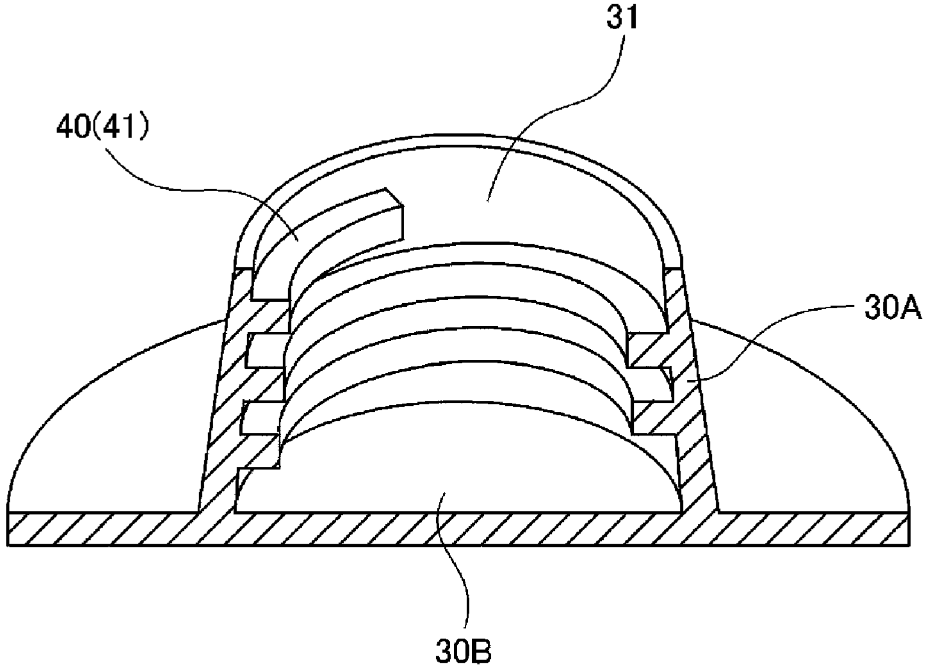
FIG. 12 is a perspective cross-sectional view schematically illustrating still another embodiment of the functional component assembly (support body).

When the outer shape of the functional component 20 is a columnar shape and the housing portion 31 has a cylindrical shape corresponding to the functional component 20, the locking portion 40 may be provided in a spiral shape as illustrated in FIG. 12. In the illustrated example, only the support body 30 provided with the spiral locking portion 40 (protrusion portion 41) is illustrated, but the functional component 20 (housing 21) is also provided with the locking portion 40 (receiving portion 42) having a shape corresponding to the spiral. In this configuration, the spiral locking portion 40 substantially functions as a screw, so the functional component 20 can be fixed to the housing portion 31 by being rotated. Therefore, the functional component 20 can be mounted parallel to the tire inner surface and the contact surface 30B of the support body 30. In addition, it is possible to reduce a load applied to the locking portion when the functional component 20 is inserted into the housing portion 31, and to fix the functional component more firmly and stably.

Figure 13:
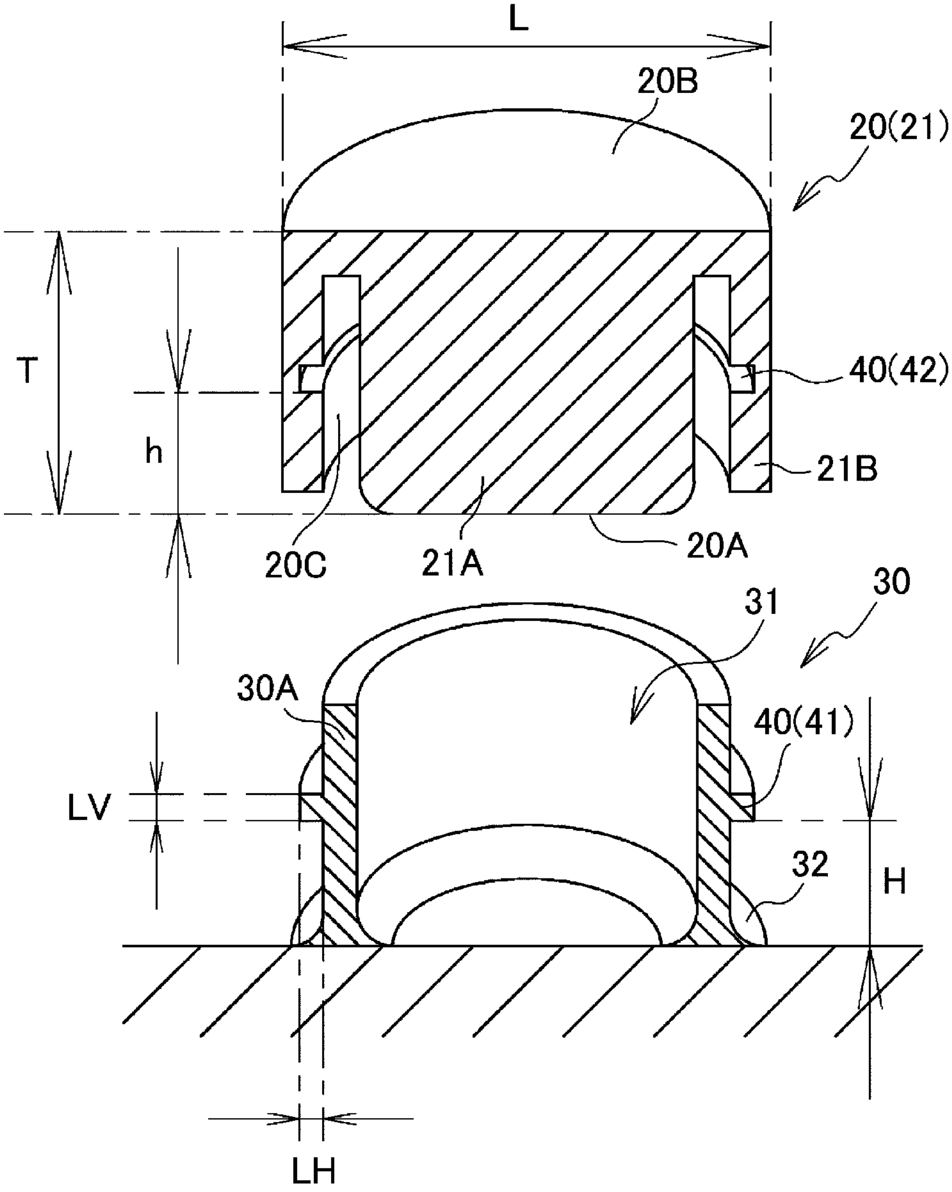
FIG. 13 is a perspective cross-sectional view schematically illustrating still another embodiment of the functional component assembly.

In the above description, the locking portion 40 is provided on the inner side of the housing portion 31 in any case. However, depending on the shape of the functional component 20 (housing 21), the locking portion 40 may be provided on an outer side of the housing portion 31. For example, in an aspect of FIG. 13, the functional component 20 (housing 21) includes a main body portion 21A that is accommodated in the housing portion 31 and an outer portion 21B that comes into contact with the housing portion 31 (side wall 30A), and when the main body portion 21A of the functional component 20 (housing 21) is accommodated in the housing portion 31, the outer portion 21B covers an outer circumference of the housing portion 31 (side wall 30A). In the case of this aspect, the locking portion 40 (protrusion portion 41) may be provided on an outer side of the housing portion 31 (side wall 30A), and the locking portion 40 (receiving portion 42) may be provided on the functional component 20 (a portion of the outer portion 21B that comes into contact with the side wall 30A). Also in the case of the aspect of FIG. 13, the above-described dimensions and various structures (for example, the plurality of locking portions 40, the spiral locking portion 40, and the like) can be appropriately combined.

When the above-described functional component assembly is used, the functional component 20 can be firmly and stably fixed. Therefore, the sensor 23 included in the functional component 20 can be easily disposed at a position suitable for acquiring the tire information. For this reason, the shortest distance between the sensor 23 included in the functional component 20 and the tire inner surface is preferably set to be equal to or less than 5 mm, and more preferably equal to or less than 3 mm. By bringing the sensor 23 close to the tire inner surface in this way, the tire information can be easily acquired. However, by using the functional component assembly of an embodiment of the present technology described above, the sensor can be more easily and reliably disposed at a suitable position close to the tire inner surface.

When the above-described functional component assembly is used, since the locking portion 40 is locked by the combination of the protrusion portion 41 and the receiving portion 42, conversely, when this state is released, the functional component 20 can be removed from the support body 30. For example, in the case where the locking portion 40 is configured by the fitting protrusion portion 41 and the fitting recess portion 42, since the locking portion is locked by fitting the fitting protrusion portion 41 into the fitting recess portion 42, conversely, when this fitting state is released, the functional component 20 can be removed from the support body 30. Therefore, the support body 30 may be fixed to the tire inner surface while the functional component 20 may be detachable from the support body 30. According to this configuration, it is possible to replace only the functional component 20 accommodated in the support body 30 in a state where the support body is left on the tire inner surface, which is advantageous for reducing environmental load and cost.

The present technology will further be described below by way of Examples, but the scope of the present technology is not limited to the Examples.

EXAMPLES

Pneumatic tires (test tires) of Comparative Examples 1 and 2 and Examples 1 to 17 with a tire size of 275/40R21 and a basic structure illustrated in FIG. 1 were manufactured, in which regarding the functional component assembly provided on the tire inner surface, the shape of the locking portion, the ratio h/H of the height H of the locking portion on the support body side and the height h of the locking portion on the functional component side in a state where the functional component is not accommodated in the support body, the maximum thickness T of the functional component, the ratio H'/T of the height H' of the locking portion on the support body side and the maximum thickness T in a state where the functional component is accommodated in the support body, the maximum length L of the functional component in the horizontal direction, the ratio LH/L of the protruding amount LH of the fitting protrusion portion and the maximum length L, the ratio LH/LV of the thickness LV and protruding amount LH of the fitting protrusion portion, and the proportion of the sum of the projection lengths a of the locking portions on the circumference of the side wall with respect to the circumferential length of the side wall were set as shown in Tables 1 and 2.

The corresponding drawing numbers are described in the "shape of locking portion" columns in Tables 1 and 2. Example 3 is an example in which a plurality of locking portions are provided as illustrated in FIG. 11, but various dimensions in each locking portion are common and have values as shown in the table. Example 4 is an example in which a spiral locking portion is provided as illustrated in FIG. 12, but various dimensions are presented assuming that each of the circumferential portions in a cross-sectional view is a locking portion (that is, assuming that a plurality of locking portions are provided in a cross-sectional view).

These test tires were evaluated for fall-off resistance and damage resistance according to the following evaluation methods. The results thereof are shown in Tables 1 and 2.

Fall-Off Resistance

Each test tire was mounted on a wheel having a rim size of 21×9.5 J and mounted on a drum tester having a drum diameter of 1707 mm, and in a state where the air pressure was 360 kPa and 88% of the maximum applied load was applied, the traveling speed was increased by 10 km/h every 10 minutes from a reference speed corresponding to the speed symbol of the tire, the presence or absence of fall-off of the functional component was checked for each speed, and the speed at the time when the fall-off occurred was measured. The evaluation results are expressed as index values with Standard Example 1 being defined as 100. Larger index values indicate higher speed at the time of fall-off, and superior fall-off resistance.

Damage Resistance

Each test tire was mounted on a wheel having a rim size of 21×9.5 J and mounted on a drum tester having a drum diameter of 1707 mm, and in a state where the air pressure was 360 kPa and 88% of the maximum applied load was applied, the traveling speed was increased by 10 km/h every 10 minutes from the reference speed corresponding to the speed symbol of the tire, the damaged state of the functional component assembly was checked for each speed, and the damage resistance was evaluated by comprehensively considering the speed at the time when the damage occurred and the damaged state of the functional component. The evaluation results are expressed as index values with Standard Example 1 being defined as 100. Larger index values indicate higher speed at the time of damage, smaller damage, and superior damage resistance.

TABLE 1-1

| | | Standard Example 1 | Comparative Example 1 | Comparative Example 2 | Example 1 | Example 2 |
|---|---|---|---|---|---|---|
| Shape of locking portion | | FIG. 10 | FIG. 10 | FIG. 10 | FIG. 10 | FIG. 4 |
| Ratio h/H | | 1.0 | 0.9 | 1.5 | 1.1 | 1.1 |
| Maximum thickness T | | 35 | 35 | 35 | 35 | 15 |
| Ratio H'/T | | 0.2 | 0.2 | 0.2 | 0.2 | 0.6 |
| Maximum length L | | 40 | 40 | 40 | 40 | 25 |
| Ratio LH/L | | 0.025 | 0.025 | 0.025 | 0.025 | 0.08 |
| Ratio LH/LV | | 5 | 5 | 5 | 5 | 1.5 |
| Proportion of sum of projection lengths α | % | 60 | 60 | 60 | 60 | 100 |
| Fall-off resistance | Index value | 100 | 98 | 102 | 101 | 110 |
| Damage resistance | Index value | 100 | 101 | 97 | 101 | 108 |

TABLE 1-2

| | | Example 3 | Example 4 | Example 5 | Example 6 | Example 7 |
|---|---|---|---|---|---|---|
| Shape of locking portion | | FIG. 11 | FIG. 12 | FIG. 4 | FIG. 4 | FIG. 4 |
| Ratio h/H | | 1.1 | 1.1 | 1.02 | 1.2 | 1.4 |
| Maximum thickness T | | 15 | 15 | 15 | 15 | 15 |
| Ratio H'/T | | 0.6 | 0.6 | 0.6 | 0.6 | 0.6 |
| Maximum length L | | 25 | 25 | 25 | 25 | 25 |
| Ratio LH/L | | 0.08 | 0.08 | 0.08 | 0.08 | 0.08 |
| Ratio LH/LV | | 1.5 | 1.5 | 1.5 | 1.5 | 1.5 |
| Proportion of sum of projection lengths a | % | 100 | 100 | 100 | 100 | 100 |
| Fall-off resistance | Index value | 113 | 114 | 106 | 111 | 113 |
| Damage resistance | Index value | 109 | 111 | 110 | 106 | 101 |

TABLE 2-1

| | | Example 8 | Example 9 | Example 10 | Example 11 | Example 12 |
|---|---|---|---|---|---|---|
| Shape of locking portion | | FIG. 4 | FIG. 4 | FIG. 4 | FIG. 4 | FIG. 4 |
| Ratio h/H | | 1.1 | 1.1 | 1.1 | 1.1 | 1.1 |
| Maximum thickness T | | 5 | 30 | 15 | 15 | 15 |
| Ratio H'/T | | 0.6 | 0.6 | 0.3 | 1 | 0.6 |
| Maximum length L | | 25 | 25 | 25 | 25 | 5 |
| Ratio LH/L | | 0.08 | 0.08 | 0.08 | 0.08 | 0.08 |
| Ratio LH/LV | | 1.5 | 1.5 | 1.5 | 1.5 | 1.5 |
| Proportion of sum of projection lengths α | % | 100 | 100 | 100 | 100 | 100 |
| Fall-off resistance | Index value | 112 | 109 | 108 | 110 | 106 |

TABLE 2-1-continued

| | | Example 8 | Example 9 | Example 10 | Example 11 | Example 12 |
|---|---|---|---|---|---|---|
| Damage resistance Proportion | Index value % | 105 | 107 | 102 | 107 | 103 |

TABLE 2-2

| | | Example 13 | Example 14 | Example 15 | Example 16 | Example 17 |
|---|---|---|---|---|---|---|
| Shape of locking portion | | FIG. 4 | FIG. 4 | FIG. 4 | FIG. 4 | FIG. 4 |
| Ratio h/H | | 1.1 | 1.1 | 1.1 | 1.1 | 1.1 |
| Maximum thickness T | | 15 | 15 | 15 | 15 | 15 |
| Ratio H'/T | | 0.6 | 0.6 | 0.6 | 0.6 | 0.6 |
| Maximum length L | | 35 | 25 | 25 | 25 | 25 |
| Ratio LH/L | | 0.08 | 0.04 | 0.4 | 0.08 | 0.08 |
| Ratio LH/LV | | 1.5 | 1.5 | 1.5 | 0.1 | 3 |
| Proportion of sum of projection lengths α | % | 100 | 100 | 100 | 100 | 100 |
| Fall-off resistance | Index value | 108 | 106 | 113 | 105 | 110 |
| Damage resistance | Index value | 105 | 109 | 103 | 109 | 104 |

As can be seen from Tables 1 and 2, in Examples 1 to 17, the fall-off resistance and the damage resistance were improved as compared with Standard Example 1. On the other hand, in Comparative Example 1, since the ratio h/H was smaller than 1, the effect of pressing the functional component against the tire inner surface was not obtained, and thus the fall-off resistance was deteriorated. In Comparative Example 2, since the ratio h/H was larger than 1, the effect of pressing the functional component against the tire inner surface was obtained, and thus the functional component was prevented from falling off. However, since the ratio h/H was too large, the damage resistance was deteriorated.

The invention claimed is:

1. A functional component assembly, comprising:

a functional component having a function of detecting a state of a tire; and a support body configured to accommodate the functional component and attached to a tire inner surface, the support body comprising a base portion having a sheet shape and a housing portion having a side wall protruding from one surface of the base portion and configured to accommodate at least a part of the functional component, an other surface of the base portion being an attachment surface to the tire inner surface, the functional component being fixed inside the housing portion via a locking portion, the locking portion being configured by a pair composed of a protrusion portion that is provided on one of the side wall of the housing portion or a portion of the functional component in contact with the side wall and that protrudes toward the other of the side wall of the housing portion or the portion of the functional component in contact with the side wall and a receiving portion that is provided on the other of the side wall of the housing portion or the portion of the functional component in contact with the side wall and that is configured to be in contact with the protrusion portion, and contact of the protrusion portion with the receiving portion fixing the functional component inside the housing portion, and in a state where the functional component is not accommodated in the support body, when a height of the locking portion on the support body side from a lower end of the side wall is H and a height of the locking portion on the functional component side from a bottom surface is h, the heights H and h satisfying a relationship $1.02 \le h/H \le 1.40$, wherein in a state where the functional component is accommodated in the support body, when a height of the locking portion on the support body side from the lower end of the side wall is H' and a maximum thickness of the functional component is T, H' and T satisfy relationships 5.0 mm$\le T \le$30.0 mm and $0.30 \le H'/T \le 1.00$, and an outer shape of the functional component is a columnar shape, the housing portion has a cylindrical shape corresponding to the functional component, and the locking portion is provided in a spiral shape.

2. The functional component assembly according to claim 1, wherein when a maximum length of the functional component in a horizontal direction is L, a protruding amount of the protrusion portion is LH, and a thickness of the protrusion portion is LV, L, LH, and LV satisfy relationships 5.0 mm$\le L \le$35.0 mm, $0.04 \le LH/L < 0.40$, and $0.10 \le LH/LV \le 3.00$.

3. The functional component assembly according to claim 1, wherein an outer shape of the functional component is a columnar shape, the housing portion has a cylindrical shape corresponding to the functional component, and a sum of projection lengths of the locking portion on a circumference of the side wall is ¾ times to 1 time a circumferential length of the side wall.

4. The functional component assembly according to claim 1, wherein a plurality of locking portions are provided along a height direction of the side wall of the housing portion and a height direction of the functional component.

5. The functional component assembly according to claim 1, wherein the functional component comprises a sensor configured to acquire tire information, and the sensor comprises a piezoelectric element.

6. The functional component assembly according to claim 1, wherein an elongation at break EB of rubber constituting the support body ranges from 50% to 900%, and a modulus at 300% elongation of the rubber constituting the support body ranges from 2 MPa to 16 MPa.

7. A tire, comprising the functional component assembly according to claim 1 attached to a tire inner surface.

8. The tire according to claim 7, wherein the functional component comprises a sensor configured to acquire tire information, and a shortest distance between the sensor and the tire inner surface is equal to or less than 5 mm.

9. The tire according to claim 7, wherein the support body is fixed to the tire inner surface while the functional component is detachable from the support body.

10. The tire according to claim 7, wherein the support body is fixed to the tire inner surface via an adhesive layer.

11. The tire according to claim 7, wherein tire information about the tire to which the functional component assembly is attached is periodically and automatically transmitted.

12. The tire according to claim 1, wherein the heights H and h satisfy a relationship $1.05 \le h/H \le 1.40$.

* * * * *